United States Patent [19]

Yoshida

[11] Patent Number: 4,596,038
[45] Date of Patent: Jun. 17, 1986

[54] METHOD AND APPARATUS FOR CHARACTER RECOGNITION

[75] Inventor: Yutaka Yoshida, Hikari, Japan

[73] Assignee: Hitachi, Ltd., Tokyo, Japan

[21] Appl. No.: 582,774

[22] Filed: Feb. 23, 1984

[30] Foreign Application Priority Data

Feb. 23, 1983 [JP] Japan ................................ 58-27547

[51] Int. Cl.$^4$ .............................................. G06K 9/18
[52] U.S. Cl. ........................................ 382/11; 382/30; 382/41
[58] Field of Search ................... 382/11, 30, 34, 41, 382/54

[56] References Cited

U.S. PATENT DOCUMENTS 2,791,310 5/1957 Jones .................................. 382/11
3,823,261 7/1974 Bolsey ................................ 382/54
4,486,775 12/1984 Catlow ............................... 382/30

Primary Examiner—Leo H. Boudreau
Assistant Examiner—Jacqueline Todd
Attorney, Agent, or Firm—Antonelli, Terry & Wands

[57] ABSTRACT

A character recognition method involves the inputting of a character attached to an article as an image signal, forming the input image signal into an image pattern, and matching the image pattern with a standard pattern. The character to be recognized is prepared by superimposing on an ordinary character a plurality of marks in a pattern characterizing that character. A letter recognition apparatus discriminates the character by extracting only the characterizing marks from the image signal through image processing and by matching the information concerning the arrangement of the characteristic marks extracted and standard information relating to standard image patterns which is stored in advance.

12 Claims, 3 Drawing Figures

METHOD AND APPARATUS FOR CHARACTER RECOGNITION

BACKGROUND OF THE INVENTION

1. Field of the Invention

The present invention relates to a character recognition method and apparatus for recognizing characters, such as numerals or letters of the alphabet.

2. Description of the Prior Art

The reading of data attached to articles presently involves a method in which the data is provided in the form of bar codes and in which the bar codes are read by means of a bar code reader. Data reading by this method is preferable because it can be practiced by means of a remarkably-simple apparatus, but it is difficult for human beings to recognize and directly read such data in the form of the bar codes attached to the articles. Therefore, this data reading operation is very inconvenient either after the articles have entered the market or when the bar code reader is broken. Accordingly, a system in which the sale of conveyance of articles or their warehousing and delivery are administered on the basis of the data read by the bar code reader is especially vulnerable to difficulties and disadvantages.

These disadvantages can be eliminated to some extent by printing on the articles alphanumeric characters that can be easily recognized and understood by human beings. However, for automatic reading, a machine or apparatus is required to recognize the characters. For an apparatus for recognizing the characters, an optical character reader (which is referred to below as an "OCR") is well known. The OCR performs a sampling operation by scanning the image of a character to be recognized with a TV camera, by converting the video signal to binary form and by dividing this binary signal into lattice-shaped picture elements. Then, the OCR recognizes the letter by segmenting the image into picture elements of regions suitable for pattern recognition from the signal which has been made discrete by the sampling operation, by matching the segmented image signal (i.e., the symmetric pattern for recognition) with a standard pattern which is stored in advance, and by selecting the most-likely category found by the matching operation. The pattern recognition technique in the OCR thus-far described has been applied not only to character recognition, but also to the recognition of the shape of or a flaw in an article.

Now, although the recognition of characters attached to articles can be accomplished by means of the aforementioned OCR or the like, the pattern recognition method of the prior art handles a tremendous amount of information and requires a large-scale apparatus including an electronic computer so as to process that tremendous amount of information quickly.

SUMMARY OF THE INVENTION

It is, therefore, an object of the present invention to provide a character recognizing method and apparatus with a simple construction for reliably recognizing characters.

Another object of the present invention is to provide a character recognizing method and apparatus for recognizing characters at a high speed.

One feature of the present invention is characterized in the provision of an ordinary character with identifying marks superimposed thereon that characterize that character, in that the marked character is input as an image signal, in that after this image signal has been preprocessed only the marked portions are extracted from the image signal, and in that the aforementioned character is discriminated by those marked portions and the standard information concerning the characters.

Other objects and features of the present invention will become apparent from the following description.

DESCRIPTION OF THE PREFERRED EMBODIMENT

The present invention will be described in detail below with reference to the accompanying drawings.

Figure 1:
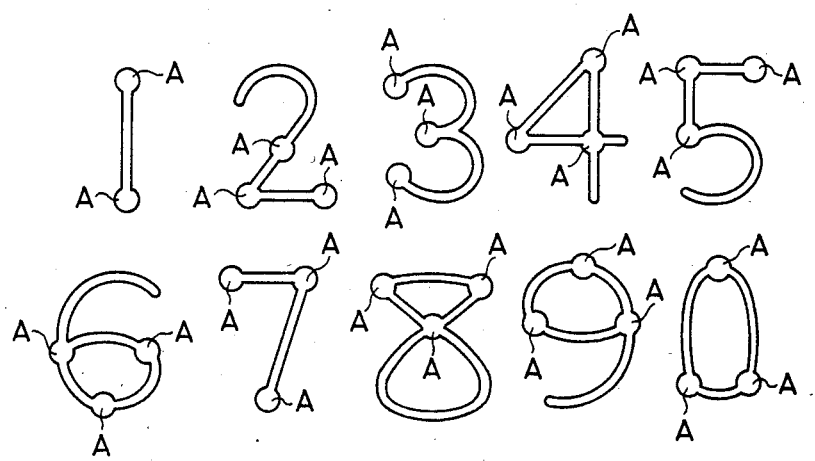
FIG. 1 is a diagram illustrating examples of characters which may be recognized by the present invention.

First, a description will be given of one form of the characters capable of recognition in accordance with the present invention, with reference to FIG. 1. FIG. 1 illustrates an example of a series of characters to be read as Arabic numerals (i.e., 0 to 9). As is apparent from FIG. 1, superimposed upon the ordinary numerals are marks A which are provided in relative positions which characterize those numerals. These marks A are located in positions which are critical for the recognition of the characters by a later-described embodiment of the present invention.

For purposes of identification, the number and arrangement (e.g., the coordinates) of the marks A are made intrinsic to the numerals they belong to. For example, the numeral 1 is formed with two marks A which are arranged at opposite ends of the vertical line forming the number. The numeral 2 is prepared with three marks A which are arranged differently from those of the numeral 1. This can be said for each of the respective numerals. The marks A in FIG. 1 are circular and are arranged on the lines of the odinary numerals so that they extend out over the lines; however, the shape of those marks need not be circular. The actual overlaying of the marks upon the characters is performed by printing or stamping the characters of FIG. 1 onto the articles. Of course, the characters shown in FIG. 1 can be recognized with ease by human beings.

An apparatus for recognizing the characters of FIG. 1 will be described with reference to FIG. 2, which is a block diagram of a character recognition apparatus according to one embodiment of the present invention. Reference numeral 3 in FIG. 2 identifies a TV camera which converts the characters of the type shown in FIG. 1 to an analog image signal. Numeral 4 identifies a binary circuit which transforms the input analog image signal into signals of binary value "1" and "0" in accordance with the brightness of the image. More specifically, the binary circuit 4 is of the well-known type of threshold detector which compares the analog electric signal from the TV camera 3 with a threshold voltage and sets the electric signal in accordance with the compared results. In other words, a thresholding circuit can be utilized as the binary circuit. Numeral 5 identifies a sampling circuit which samples the binary input image signal at suitable regions to divide the sampled image signal into frames comprising N×M lattice-shaped picture elements expressed by "1" or "0". Numeral 6 identifies a segmentation circuit which segments the $N_1 \times M_1$ picture elements covering the area of one character from the $N \times M$ picture elements which have been processed by the sampling circuit 5. Here, inequalities $N > N_1$ and $M > M_1$ hold. In other words, the image signal covering the region of one letter ($N_1 \times M_1$) necessary for character recognition is separated from the image signal covering one frame expressed by $N \times M$ picture elements, which has been input by the TV camera. Numeral 10 identifies a timing circuit which outputs timing signals to the various components of the character recognition apparatus to coordinate the operations thereof.

The elements 3–6 and 10 form a standard camera interface circuit of a character recognition device, such as the RSB-6020, manufactured and sold by EG & G Reticon. This type of camera interface is also disclosed in the publication "Denkigakkai Ronbunski, Vol. 94-C, No. 5, at pages 89–96.

Figure 2:
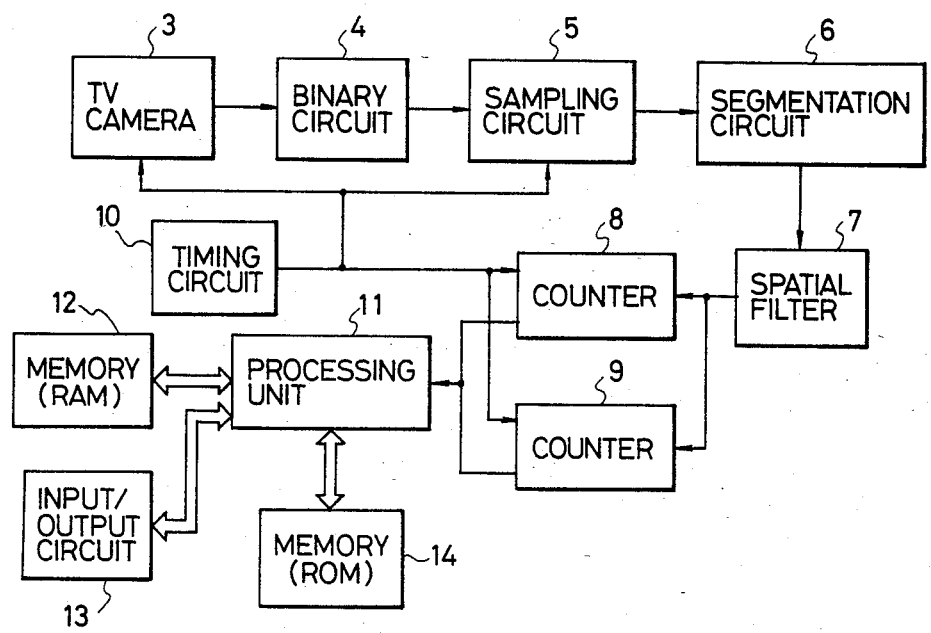
FIG. 2 is a block diagram of one embodiment of the present invention.

Numeral 7 in FIG. 2 identifies a spatial filter which extracts only the marks A superimposed upon one character (namely, filtering out the portions of the ordinary character) from the segmented image signal corresponding to that letter. The well-known AND-OR circuit may be employed as that filter. This AND-OR circuit effects twodimensional AND-OR operations on the vicinity of each picture element of the two-dimensional image signal $N_1 \times M_1$ and the load matrix (i.e., the matrix of weight coefficients) to detect the marks A. An example of the spatial filter 7 is disclosed in the publication "Nikkei Electronics", Vol. 7, Nov. 24, 1978, in which various types of image processors are disclosed on pages 110 to 140. The details of the spatial filter 7 are shown particularly in FIG. 21 on page 130 of this publication.

Numerals 8 and 9 identify counters which determine the X-coordinate (i.e., the horizontal position) and the Y-coordinate (i.e., the vertical position) of the marks A in the $N_1 \times M_1$ area, which have been detected and extracted by the spatial filter 7. Numeral 11 identifies a processing unit by which the identity of the character is decided. Numeral 12 identifies a random access memory (i.e., RAM) in which the coordinate detection results of the counters 8 and 9 are stored. Numeral 14 identifies a read only memory (i.e., ROM) in which is stored a table with the coordinates of the center of gravity and apex of each character, which represents the basic information for character recognition in accordance with this invention. Numeral 13 is an input/output circuit which outputs the recognized character information to a higher level computer or display, or inputs necessary data therefrom.

The operations of the apparatus shown in FIG. 2 are as follows. The TV camera 3 is so arranged that it can pick up the characters attached to the articles. As a result, the TV camera 3 can convert the optical image of the characters into an analog image signal and supply this signal to the binary circuit 4. The binary circuit 4 compares its analog input signal with a selected threshold voltage and converts the input signal into a binary signal.

The sampling circuit 5 receives that binary signal and separates this signal into frames comprising discrete $N \times M$ picture elements. The segmentation circuit 6 then separates the image signal of one character from the image signal of one frame of the TV camera. The processings performed by the circuits 4, 5 and 6, which form the typical camera interface circuit, are usually called "preprocessing operations". Now, the image signal segmented by the circuit 6 is input to the spatial filter 7, in which a processing is conducted where only the marks A characterizing the character are output as the image signal. More specifically, the ordinary letter portions of each character are removed, as illustrated in FIG. 3, by the filter 7.

Figure 3:
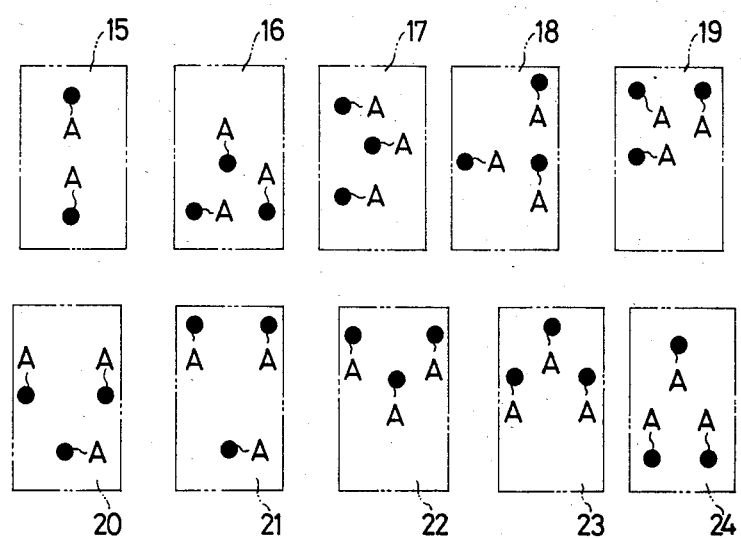
FIG. 3 is a diagram illustrating the procedures for extracting marked portions of characters to be identified in accordance with the present invention.

In FIG. 3, numerals 15 to 24 indicate patterns corresponding respectively to the numerals 0 to 9 and are different from one another in the number of arrangement of the marks A. As a result, the characters can be discriminated by comparing the image signal output from the filter 7 and information describing a standard pattern (e.g., an image pattern such as provided by a template). In the embodiment of FIG. 2, the X-Y coordinates of the marks are determined from the image signal of the marked portions only of FIG. 3, which is shown by the $N_1 \times M_1$ picture elements. In other words, the plane coordinates of the marks A in both the X and Y directions are counted by the counters 8 and 9, respectively. The counting operations are conducted by inputting synchronous pulses proportional to the scanning operation generated by the timing circuit 10. The counted values (i.e., the coordinates) counted by the counters 8 and 9 are stored in the RAM 12 by the processing unit 11.

Subsequently, the processing unit 11 reads out the coordinates of the stored marks and eliminates an unnecessary data contained in the data by using the principles that there are at least two marks A in each character and that, if there are three points, the marks are arranged in the form of an isosceles triangle (as can be seen in FIG. 1 or FIG. 3). This is because it is conceivable that the image signal contains information from blots or stains in addition to the information on the characters, and it is desirable to prevent such unnecessary information from adversely affecting the decision.

After this processing, the coordinates of the marks A are read by the processing unit 11 to determine the coordinates of the center of gravity of the triangle formed by the marks A. This determination of the coordinates of the center of gravity by the processing unit 11, which involves simple arithmetic calculations, makes it possible to discriminate a considerable range of characters. After the coordinates of the center of gravity have been determined, the standard coordinates of the center of gravity are read from the table of the coordinates which are stored in the ROM 14, and a comparison operation is performed. The character corresponding to the closest coordinate of the center of gravity is selected. In case discrimination is impossible solely by comparison of the coordinates of the center of gravity, the coordinates of the mark A located at the apex of the isosceles triangle are determined from the respective marks A and are compared by the processing unit 11 with the coordinates of the standard apex, which are read out from a table of the coordinates of the apex stored in the ROM 14. In this case too, the character corresponding to the closest coordinate of the apex is selected. This selection may be effected with respect to all standard image patterns, or for increased processing speed and reliability, such selection may involve only certain standard image patterns resulting from the center of gravity selection process. When the character has been recognized in this way, its identification is output to the input/output circuit 13.

Accordingly to the embodiment shown in FIG. 2, character recognition can be conducted with a device of simple construction by superimposing the characteristic extracting marks upon a character.

In the character recognition method thus-far described, the marks A have all been of the same kind, but the present invention should not be limited thereto. For example, several kinds of marks may be superimposed upon a character. In the aforementioned embodiment, moreover, character recognition is conducted by comparing the center of gravity or the apex of the shape indicated by the lines joining the respective marks with standard information, but the present invention should not be limited thereto. For example, the present invention includes a modification in which character recognition is conducted by applying a well-known matching method to the number and arrangement of the marks characterizing the respective characters.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A character recognition method comprising the steps of: optically scanning a character to be recognized which is formed of an ordinary character on which there is provided a plurality of marks characterizing said character; converting the image of marked character to an electrical image signal; extracting only those signal portions relating to the marked portions of the character from said image signal; and discriminating said character by comparing the image information of said marked portions with standard information relating to standard image patterns stored in advance, wherein said marks are formed on said character in the outline of a polygon and said character recognition is conducted by comparing the coordinates of the center of gravity of such polygon formed by the arrangement of said marked portions to the coordinates of the center of gravity of marks formed on various standard characters to select a standard character corresponding to said optically scanned character.

2. A character recognition method as set forth in claim 1, wherein said plurality of marks is composed of three circles which are arranged to form an isosceles triangle.

3. A character recognition method comprising the steps of: optically scanning a character to be recognized which is formed of an ordinary character on which there is provided a plurality of marks composed of three circles which are arranged to form an isosceles triangle characterizing said character; converting the image of said marked character to an electrical image signal; extracting only those signal portions relating to the marked portions of the character from said image signal; and discriminating said character by comparing the image information of said marked portions with standard information relating to standard image patterns stored in advance, wherein said character recognition is conducted on the basis of the coordinates of the center of gravity which is determined from the positional coordinates of the three marks forming said isosceles triangle.

4. A character recognition method comprising the steps of: optically scanning a character to be recognized which is formed of an ordinary character on which there is provided a plurality of marks composed of three circles which are arranged to form an isosceles triangle characterizing said character; converting the image of said marked character to an electrical image signal; extracting only those signal portions relating to the marked portions of the character from said image signal; and discriminating said character by comparing the image information of said marked portions with standard information relating to standard image patterns stored in advance, wherein said character recognition is conducted on the basis of both the coordinates of the center of gravity, which is determined from the positional coordinates of the three marks forming said isosceles triangle, and the positional coordinates of the mark which is positioned at the apex of said isosceles triangle.

5. A character recognizing apparatus comprising: image pickup means for converting to an electrical image signal the optical image of a character to be recognized which is formed by an ordinary character having a plurality of marks characterizing said character included thereon; filtering means for extracting only those portions of the image signal relating to the marked portions of said character; and correlation means for discriminating said character by correlating the image signal of said marked portions with signals representing the marked portions of standard image patterns of characters including the character to be recognized, wherein said marks are formed on said character in the outline of a polygon, and wherein said correlation means includes first means for determining the positional coordinates of said marked portions of the character in said image signal, second means for determining the coordinates of the center of gravity of said polygon defined by said marks from said positional coordinates determined by said first means, and means for comparing said coordinates of the center of gravity and the coordinates of the center of gravity for the polygons formed by the marks of said standard image patterns in order to select a character corresponding to the closest coordinates of the center of gravity.

6. A character recognition apparatus as set forth in claim 5, wherein said correlation means further includes memory means for storing the coordinates of the center of gravity of the polygons formed by the marks of a plurality of standard image patterns of different characters.

7. A character recognition method comprising the steps of: optically scanning a character to be recognized which is formed of an ordinary character on which there is provided a plurality of marks characterizing said character; converting the image of a marked character to an electrical image signal; extracting only those signal portions relating to the marked portions of the character from said image signal; determining the coordinates of said marked portions; determining the coordinate of the center of gravity of a polygon which is formed by the arrangement of said coordinates; and discriminating said character by comparing said coordinate of the center of gravity with standard coordinates relating to standard patterns stored in advance.

8. A character recognition method as set forth in claim 7, wherein said plurality of marks is composed of three marks which are arranged to form a triangle.

9. A character recognition method comprising the steps of: optically scanning a character to be recognized which is formed of an ordinary character on which there is provided a plurality of three marks in an isosceles arrangement characterizing said character; converting the image of a marked character to an electrical image signal; extracting only those signal portions relating to the three marked portions of the character from said image signal; determining the positional coordinates of said three marked portions; determining the coordinate of the center of gravity of an isosceles triangle which is formed by the isosceles arrangement of said positional coordinates; and discriminating said character by comparing said coordinate of the center of gravity with standard information of coordinates relating to standard patterns stored in advance.

10. A character recognition method as set forth in claim 9, wherein said character recognition is conducted on the basis of both said coordinate of the center of gravity and said positional coordinate which is positioned at the apex of said isosceles triangle.

11. A character recognizing apparatus comprising: image pickup means for converting to an electrical image signal the optical image of a character to be recognized which is formed by an ordinary character having a plurality of marks characterizing said character included thereon; filtering means for extracting only those portions of the image signal relating to the marked portions of said character; and correlation means for discriminating said character by correlating the image signal of said marked portions with signals representing the marked portions of standard image patterns of characters including the character to be recognized, wherein said marks are formed on said character in the outline of a polygon, and wherein said correlation means includes first means for determining the positional coordinates of said marked portions of the character in said image signal, second means for determining the coordinates of the center of gravity of said polygon defined by said marks from said positional coordinates determined by said first means, and means for comparing said coordinates of the center of gravity and the coordinates of the center of gravity for the polygons formed by the marks of said standard image patterns in order to select a character corresponding to the closest coordinates of the center of gravity.

12. A character recognition apparatus as set forth in claim 11, wherein said correlation means further includes memory means for storing the coordinates of the center of gravity of the polygons formed by the marks of a plurality of standard image patterns of different characters.

* * * * *